United States Patent
Srinivasan

(10) Patent No.: US 7,471,726 B2
(45) Date of Patent: Dec. 30, 2008

(54) SPATIAL-DOMAIN LAPPED TRANSFORM IN DIGITAL MEDIA COMPRESSION

(75) Inventor: Sridhar Srinivasan, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 754 days.

(21) Appl. No.: 10/620,744

(22) Filed: Jul. 15, 2003

(65) Prior Publication Data

US 2005/0013359 A1 Jan. 20, 2005

(51) Int. Cl.
*H04N 7/18* (2006.01)
(52) U.S. Cl. .............................. 375/240.25; 375/240.26
(58) Field of Classification Search .................................
375/240.01–240.29
See application file for complete search history.

(56) References Cited

U.S. PATENT DOCUMENTS

| | | | |
|---|---|---|---|
| 4,754,492 A | 6/1988 | Malvar | |
| 5,297,236 A * | 3/1994 | Antill et al. .................. | 704/203 |
| 5,311,310 A * | 5/1994 | Jozawa et al. .......... | 375/240.13 |
| 5,384,849 A | 1/1995 | Jeong | |
| 5,805,739 A * | 9/1998 | Malvar et al. ................ | 382/253 |
| 5,822,000 A | 10/1998 | Yoon | |
| 5,850,294 A | 12/1998 | Apostolopoulos et al. | |
| 5,859,788 A | 1/1999 | Hou | |
| 5,933,541 A | 8/1999 | Kutka et al. | |
| 5,970,173 A | 10/1999 | Lee et al. | |
| 5,973,755 A | 10/1999 | Gabriel | |
| 5,982,459 A | 11/1999 | Fandrianto et al. | |
| 6,011,625 A | 1/2000 | Glass | |
| 6,029,126 A | 2/2000 | Malvar | |
| 6,064,776 A * | 5/2000 | Kikuchi et al. .............. | 382/260 |
| 6,073,153 A | 6/2000 | Malvar | |
| 6,101,279 A | 8/2000 | Nguyen et al. | |
| 6,115,689 A | 9/2000 | Malvar | |
| 6,154,762 A | 11/2000 | Malvar | |
| 6,219,458 B1 | 4/2001 | Zandi et al. | |
| 6,253,165 B1 | 6/2001 | Malvar | |
| 6,307,887 B1 | 10/2001 | Gabriel | |
| 6,324,560 B1 | 11/2001 | Malvar | |
| 6,370,502 B1 | 4/2002 | Wu et al. | |
| 6,393,061 B1 * | 5/2002 | Owechko ................ | 375/240.29 |
| 6,393,156 B1 * | 5/2002 | Nguyen et al. .............. | 382/248 |

(Continued)

FOREIGN PATENT DOCUMENTS

AU 7351001 1/2002

(Continued)

OTHER PUBLICATIONS

H. S. Malvar, "Signal Processing With Lapped Transforms," Norwood, MA: Artech House, , pp. 175-219, 264-273, 1992.

(Continued)

*Primary Examiner*—Andy S Rao
(74) *Attorney, Agent, or Firm*—Klarquist Sparkman, LLP

(57) ABSTRACT

An improved spatial-domain lapped transform (SDLT) in a digital media codec uses mismatched relaxed pre-processing filter and aggressive post-processing filter to minimize range expansion while increasing the smoothing effect to reduce blocking artifacts of block transform-based coding. The improved SDLT can further include a range-limiting or clipping operation to limit the range expansion from the pre-processing filter. Additionally, the SDLT can selectively switch pairs of pre- and post-processing filters based on a quality metric.

35 Claims, 7 Drawing Sheets

U.S. PATENT DOCUMENTS

| | | |
|---|---|---|
| 6,421,464 B1 | 7/2002 | Tran et al. |
| 6,487,574 B1 | 11/2002 | Malvar |
| 6,496,795 B1 | 12/2002 | Malvar |
| 6,728,315 B2 | 4/2004 | Haskell et al. |
| 6,728,316 B2 | 4/2004 | Enficiaud et al. |
| 6,763,068 B2 | 7/2004 | Oktem |
| 6,771,828 B1 | 8/2004 | Malvar |
| 6,771,829 B1 | 8/2004 | Topiwala et al. |
| 6,865,229 B1 | 3/2005 | Pronkine |
| 7,006,699 B2 | 2/2006 | Malvar |
| 7,050,504 B2 | 5/2006 | Joch et al. |
| 7,106,797 B2 | 9/2006 | Malvar |
| 7,110,610 B2 | 9/2006 | Malvar |
| 7,116,834 B2 | 10/2006 | Malvar |
| 7,155,065 B1 | 12/2006 | Malvar |
| 7,167,522 B2 | 1/2007 | Webb |
| 7,181,403 B2 | 2/2007 | Wu et al. |
| 7,275,036 B2 | 9/2007 | Geiger et al. |
| 2002/0118759 A1 | 8/2002 | Enficiaud et al. |
| 2003/0128756 A1 | 7/2003 | Oktem |
| 2003/0152146 A1 | 8/2003 | Lin |
| 2003/0206582 A1 | 11/2003 | Srinivasan |
| 2005/0013359 A1 | 1/2005 | Srinivasan |

FOREIGN PATENT DOCUMENTS

| | | |
|---|---|---|
| EP | 0467054 B1 | 1/1992 |
| WO | WO 02/07438 | 1/2002 |

OTHER PUBLICATIONS

Trac D. Tran, "Lapped Transform via Time-Domain Pre- and Post-Processing," 2001 Conference on Information Sciences and Systems, The Johns Hopkins University, Mar. 21-23, 2001.

International Organization for Standardisation, ISO/IEC JTC1/SC29/WG11 N4668, "Coding of Moving Pictures and Audio," Mar. 2002, Title: MPEG-4 Overview—(V.21—Jeju Version), Editor: Rob Koenen (rob.koenen@m4if.org), available at http://www.chiariglione.org/mpeg/standards/mpeg-4/mpeg-4.htm.

"H.264 & IPTV Over DSL—Enabling New Telco Revenue Opportunities," *White Paper*, Intel/Envivio, May 15, 2004, available at http://www.envivio.com/images/products/H264whitepaper.pdf.

Trac D. Tran, Jie Liang, and Chengjie Tu, "Lapped Transform via Time-Domain Pre- and Post-Filtering," *IEEE Transactions on Signal Processing*, vol. 51, No. 6, pp. 1557-1571, Jun. 2003.

K. R. Rao and J. Hwang, "Techniques and Standards for Image, Video, and Audio Coding," Englewood Cliffs, NJ: Prentice-Hall, 1996.

H. W. Park and Y. L. Lee, "A post processing method for reducing quantization effects in low bit-rate moving picture coding," *IEEE Trans. Circuits Syst.*, Video Technol., vol. 9, pp. 161-171, Feb. 1999.

J. Apostolopoulos and N. Jayant, "Post-processing for very-low-bit-rate video compression," *IEEE Trans. Image Processing*, vol. 8, pp. 1125-1129, Aug. 1999.

T. D. Tran and C. Tu, "Lapped transform based video coding," *Proc. SPIE Applicat. Digital Image Processing XXIV*, San Diego, CA, pp. 319-333, Aug. 2001.

Chengjie Tu and Trac D. Tran, "Context-Based Entropy Coding of Block Transform Coefficients for Image Compression," *IEEE Transactions On Image Processing*, vol. 11, No. 11, pp. 1271-1283, Nov. 2002.

R. L. de Queiroz and T. D. Tran, "Lapped transforms for image compression," *The Handbook on Transforms and Data Compression*, edited by K. R. Rao and P. Yip, CRC Press, pp. 197-265, Oct. 2000.

Malvar, "Lapped Transforms for Efficient Transform/Subband Coding," *IEEE Transactions on Acoustics, Speech and Signal Processing*, vol. 38, No. 6, pp. 969-978 (1990).

Malvar, "Biorthogonal and Nonuniform Lapped Transforms for Transform Coding with Reduced Blocking and Ringing Artifacts," appeared in *IEEE Transactions on Signal Processing, Special Issue on Multirate Systems, Filter Banks, Wavelets, and Applications*, vol. 46, 29 pp. (1998).

Shlien, "The Modulated Lapped Transform, Its Time-Varying Forms, and Its Applications to Audio Coding Standards," *IEEE Transactions on Speech and Audio Processing*, vol. 5, No. 4, pp. 359-366 (Jul. 1997).

ITU-T, "ITU-T Recommendation H.261: Video Codec for Audiovisual Services at $p\times64$ kbits," 28 pp. (1993).

ITU-T, "ITU-T Recommendation H.262: Information Technology—Generic Coding of Moving Pictures and Associated Audio Information: Videol," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

Joint Video Team (JVT) of ISO/IEC MPEG & ITU-T VCEG, "Joint Final Committee Draft (JFCD) of Joint Video Specification," JVT-D157, 207 pp. (Aug. 2002).

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005).

Adams, "Generalized Reverisble Integer-to-Integer Transform Framework," 2003 IEEE Pacific Rim Conference on Communications, Computers, and Signal Processing, vol. 2, Aug. 2003, pp. 1000-1003.

Hao et al., "Matrix Factorizations for Reversible Integer Mapping," IEEE Transactions on Signal Processing, vol. 49, Issue 10, Oct. 2001, pp. 2314-2324.

Klausutis et al., "Variable Block Size Adaptive Lapped Transform-based Image Coding," 1997 International Conference on Image Processing (ICIP '97), vol. 3, pp. 686-689 (1997).

de Queiroz et al., "Time-Varying Lapped Transforms and Wavelet Packets," *IEEE Transactions on Singal Processing*, vol. 41, No. 12, pp. 3293-3305 (1993).

Malvar, *Signal Processing with Lapped Transforms*, Artech House, Norwood, MA, pp. iv, vii-xi, 175-218, and 353-357 (1992).

U.S. Appl. No. 60/488,710, filed Jul. 2003, Srinivasan et al.

Ahmed et al., "Discrete Cosine Transform," IEEE Transactions on Computers, C-23 (Jan. 1974), pp. 90-93.

Bhaskaran et al., "Image and Video Compression Standards Algorithms and Architectures," 2nd ed., 1997, pp. 192-194.

Goel et al., "Pre-processing form MPEG Compression Using Adaptive Spatial Filtering," Proceedings of 1995 IEEE International Conference on Consumer Electronics, 1995, pp. 246-247.

Jain, "Fundamentals of Digital Image Processing," Chapters 2, 5, and 11, Prentice Hall, 189 pp. (1989).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," BetaNews, 17 pp. (Jul. 19, 2002) [Downloaded from the World Wide Web on Aug. 8, 2003].

Paeth, "A Fast Algorithm for General Raster Rotation," Proceedings of Graphics Interface '86, pp. 77-81, May 1986.

Proposed SMPTE Standard for Television: VC-1 Compressed Video Bitstream Format and Decoding Process, pp. 1-500, (Aug. 2005).

Tanaka et al., "A Rotation Method for Raster Image Using Skew Transformation," Proc IEEE Conf on Computer Vision and Pattern Recognition, pp. 272-277, Jun. 1986.

Wien, "Variable Block-Size Transforms for Hybrid Video Coding," Dissertation, 182 pp. (Feb. 2004).

\* cited by examiner $Y = P_f X$ $Range(X) = R_x$ $Range(Y) = R_y \gg R_x$

Software 880 Implementing Improved
Spatial-Domain Lapped Transform

SPATIAL-DOMAIN LAPPED TRANSFORM IN DIGITAL MEDIA COMPRESSION

TECHNICAL FIELD

The invention relates generally to block transform-based digital media (e.g., video) compression, and more particularly relates to spatial-domain lapped transforms.

BACKGROUND

Block Transform-Based Coding

Transform coding is a compression technique used in many audio, image and video compression systems. Uncompressed digital image and video is typically represented or captured as samples of picture elements or colors at locations in an image or video frame arranged in a two dimensional grid. This is referred to as a spatial-domain representation of the image or video. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling. Similarly, digital audio is typically represented as time-sampled audio signal stream. For example, a typical audio format consists of a stream of 16-bit amplitude samples of an audio signal taken at regular time intervals.

Uncompressed digital audio, image and video signals can consume considerable storage and transmission capacity. Transform coding reduces the size of digital audio, images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain, or of audio in the time domain.

More specifically, a typical block transform-based codec 100 shown in FIG. 1 divides the uncompressed digital image's pixels into fixed-size two dimensional blocks ($X_1, \ldots X_n$), each block possibly overlapping with other blocks. A linear transform 120-121 that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized 130 (i.e., reduced in resolution, such as by dropping least significant bits of the coefficient values or otherwise mapping values in a higher resolution number set to a lower resolution), and also entropy or variable-length coded 130 into a compressed data stream. At decoding, the transform coefficients will inversely transform 170-171 to nearly reconstruct the original color/spatial sampled image/video signal (reconstructed blocks $\hat{X}_1, \ldots \hat{X}_n$).

The block transform 120-121 can be defined as a mathematical operation on a vector x of size N. Most often, the operation is a linear multiplication, producing the transform domain output y=M x, M being the transform matrix. When the input data is arbitrarily long, it is segmented into N sized vectors and a block transform is applied to each segment. For the purpose of data compression, reversible block transforms are chosen. In other words, the matrix M is invertible. In multiple dimensions (e.g., for image and video), block transforms are typically implemented as separable operations. The matrix multiplication is applied separably along each dimension of the data.

For compression, the transform coefficients (components of vector y) may be selectively quantized (i.e., reduced in resolution, such as by dropping least significant bits of the coefficient values or otherwise mapping values in a higher resolution number set to a lower resolution), and also entropy or variable-length coded into a compressed data stream.

At decoding in the decoder 150, the inverse of these operations (dequantization/entropy decoding 160 and inverse block transform 170-171) are applied on the decoder 150 side, as shown in FIG. 1. While reconstructing the data, the inverse matrix $M^1$ (inverse transform 170-171) is applied as a multiplier to the transform domain data. When applied to the transform domain data, the inverse transform nearly reconstructs the original time-domain or spatial-domain digital media.

While compressing a still image (or an intra coded frame in a video sequence), most common standards such as MPEG-2, MPEG-4 and Windows Media partition the image into square tiles and apply a block transform to each image tile. The transform coefficients in a given partition (commonly known as block) are influenced only by the raw data components within the block. Irreversible or lossy operations on the encoder side such as quantization cause artifacts to appear in the decoded image. These artifacts are independent across blocks and produce a visually annoying effect known as the blocking effect. Likewise for audio data, when non-overlapping blocks are independently transform coded, quantization errors will produce discontinuities in the signal at the block boundaries upon reconstruction of the audio signal at the decoder. For audio, a periodic clicking effect is heard.

Several techniques are used to combat the blocking effect—the most popular among these are the deblocking filter that smoothes inter block edge boundaries, and spatial extrapolation that encodes differences between the raw input data and a prediction from neighboring block edges. These techniques are not without their flaws. For instance, the deblocking filter approach is "open loop", i.e. the forward transform process does not take into account the fact that deblocking is going to be performed prior to reconstruction on the decoder side. Besides, both these techniques are computationally expensive.

In order to minimize the blocking effect, cross block correlations can be exploited. One way of achieving cross block correlation is by using a lapped transform as described in H. Malvar, "Signal Processing with Lapped Transforms," Artech House, Norwood Mass., 1992. A lapped transform is a transform whose input spans, besides the data elements in the current block, a few adjacent elements in neighboring blocks. Likewise, on the reconstruction side the inverse transform influences all data points in the current block as well as a few data points in neighboring blocks.

For the case of 2-dimensional (2D) data, the lapped 2D transform is a function of the current block, together with select elements of blocks to the left, top, right, bottom and possibly top-left, top-right, bottom-left and bottom-right. The number of data points in neighboring blocks that are used to compute the current transform is referred to as the overlap.

Spatial Domain Lapped Transform

The lapped transform can be implemented in the transform domain, as a step that merges transform domain quantities after a conventional block transform. Else, it can be implemented in the spatial-domain by a pre-processing stage that is applied to pixels within the range of overlap. These two implementations are mathematically related and therefore equivalent.

FIG. 2 shows an example of a conventional spatial-domain lapped transform. In the example shown, the overlap is 2 pixels, and two pixels each from the two adjacent blocks shown are pre-processed in pre-processing stage 210. Two pre-processed outputs are sent to each of the blocks for block transform-based coding by codec 100 as in FIG. 1. An inverse of the pre-processing stage is applied at post-processing stage 220 after decoding. With a judicious choice of pre-processing and block transform, a wide range of lapped transforms can be realized.

A key advantage of the spatial domain realization of the lapped transform is that an existing block transform-based codec can be retrofitted with a pre- and post-processing stage to derive the benefits of the lapped transform, i.e., reduced block effect and better compression, using an existing codec framework. Pre-processing 210 and post-processing can be represented as a matrix multiplication as shown in FIG. 3. In the conventional spatial-domain lapped transform 200, the pre-processing and post-processing matrices are inverses of each other, i.e., pre-processing matrix ($P_f$) and the inverse or post-processing matrix ($P_i$) multiplied together equal the identity matrix I.

However, there is a critical flaw to the conventional spatial-domain lapped transform that prevents its practical use: the expansion of the range of data subsequent to pre-processing.

More specially, a useful pair of pre- and post-processing matrix operations has the following characteristics:

1. The post processing stage 220 "smoothes" the block boundary—mathematically if post processing is implemented as the matrix multiply $\hat{x}=P_i\hat{y}$, then the matrix $P_i$ has its eigenvalues $\leq 1$.
2. Since the pre and post processing operations are inverses in the theoretical design, the pre-processing stage has eigenvalues $>1$, i.e., it is range expansive.
3. Often, a desirable design rule is to require that a linear ramp across the block edge be converted to a step edge at the block boundary by pre-processing. In the example shown in FIG. 4, the pixel values 430-433 of two adjacent blocks in an image initially correspond to a color gradient or linear ramp 410. The pre-processing operation converts these pixel values to lie on a step edge 420. In the post-processing step, the same step edge will be converted back to a linear ramp, thereby also squelching (smoothing) the blocking effect that may result from block transform-based coding.

Point (3) above leads to a very poor spectral behavior for matrices $P_f$ and $P_i$.

This causes tremendous range expansion and prevents practical use of the conventional spatial-domain lapped transform in FIG. 2. The problem is further exacerbated in 2 and higher dimensions, since the range expansion is squared or raised to a higher power.

Besides the problem of increased range, the pre- and post-processing steps are typically defined in infinite precision. Since the post-processing stage must be replicated on decoders with different floating point implementations that must match with the "golden" decoder, post-processing is often defined in scaled integer arithmetic. The pre-processing matrix may have entries that are floating point.

SUMMARY

Various improvements to the spatial-domain lapped transform (SDLT) in a digital media codec or compression system address the above-noted flaws of the conventional spatial-domain lapped transform depicted in FIGS. 1-4.

According to a first improvement, the pre- and post-processing operations (also referred to as "filters") used in the SDLT are not required to be inverses of each other. With a judicious choice of these processes, range expansion is kept to a minimum. In general, the pre-processing operation is "relaxed," whereas the post-processing operation is made more "aggressive".

According to a second improvement, the SDLT can include a range-limiting operation. Subsequent to the relaxed pre-processing operation just described, the data points lying outside a pre-determined expanded range are clipped to within a permissible range.

In a third improvement, the SDLT varies the pre-processing and post-processing operations based on a global quality metric (such as a frame level quantization parameter, QP, in video frames). The SDLT includes a set of one or more pairs of pre- and post-processing filters, and chooses a certain pair of filters from the set based on the global quality metric. In a simple embodiment, the compression system uses a pair of pre- and post-processing filters above a threshold QP, and omits the pre- and post-processing operations below the threshold QP.

Various embodiments of the spatial-domain lapped transform can incorporate separate of these improvements individually, or alternatively two or more of these improvements in combination.

Additional features and advantages of the invention will be made apparent from the following detailed description of embodiments that proceeds with reference to the accompanying drawings.

DETAILED DESCRIPTION

The following description is directed to a digital media compression system or codec, which implements an improved spatial-domain lapped transform. For purposes of illustration, an embodiment of a compression system incorporating the improved spatial-domain lapped transform is a digital video compression system, specifically the digital video compression codec of the Microsoft® Windows Media Player (WMP) system. Alternatively, the improvements of the spatial-domain lapped transform also can be incorporated into other digital video compression systems or codecs, such as audio and image codecs, whether implementing the WMP standard media compression or another standard (e.g., MPEG or like other standards).

1. Improved Spatial-Domain Lapped Transform

Figure 6:
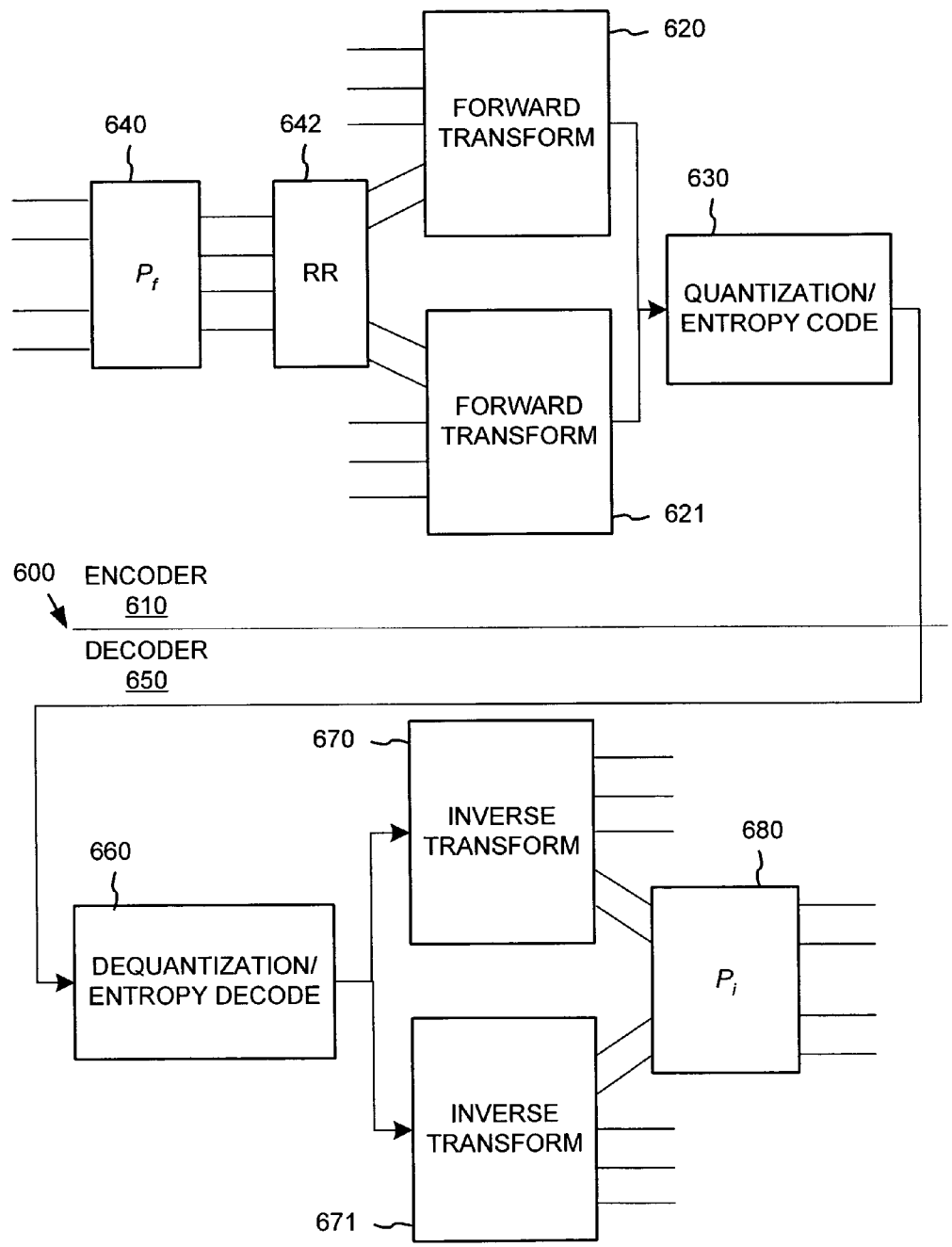
FIG. 6 is a block diagram of a block transform-based codec incorporating the improved spatial-domain lapped transform.

With reference to FIG. 6, an improved spatial-domain lapped transform (SDLT) is incorporated into an existing block transform-based compression system (referred to as codec 600). In one example implementation, the block transform-based compression system 600 is the digital video codec implemented in the Microsoft Windows Media Player (WMP), which is described, inter alia, in co-pending U.S. patent application Ser. No. 10/322,383, entitled "Motion Compensation Loop With Filtering," filed Dec. 17, 2002, the disclosure of which is hereby incorporated by reference. For intra-frame blocks of video, the encoder 610 in the WMP Codec applies a forward transform 620-621 to respective intra-blocks of reference frames of the video, then quantizes and entropy encodes the resulting transform coefficients of the blocks in a quantization/entropy code unit 630. In accordance with the WMP video compression standard, the forward transform 620-621 in the encoder 610 can be an integerized form of the Discrete Cosine Transform (DCT) or other similar transform matrix, as described in co-pending U.S. patent application Ser. No. 10/376,147, entitled "2-D Transforms For Image And Video Coding," filed Feb. 28, 2003, the disclosure of which is hereby incorporated by reference.

At the decoder 650, the inverse of the operations at the encoder are carried out. A dequantization/entropy decode unit 660 decodes and dequantizes the transform-domain representation of respective blocks, then the inverse block transforms 670-671 are applied to reconstruct the spatial-domain representation of the blocks.

The codec 600 also incorporates the improved SDLT implemented as a pre-processing filter 640 added prior to the forward transform 620-621 and post-processing filter 680 following the inverse transform 670-671. The improved SDLT further includes a range reduction operation 642 (labeled "RR").

The pre-processing filter 640 and post-processing filter 680 in the improved SDLT are not exactly matching transforms (i.e., inverses of each other), as are the pre-processing and post-processing operations in conventional SDLTs described in the Background above. Matching is required if the encoder's input must be reconstructed without loss by the decoder. However, in practical video and image coding schemes, data loss is acceptable and inevitable. Accordingly, for digital media compression context, the improved SDLT drops the requirement of matching pre- and post-processing operations, although it remains desirable to minimize the round-trip loss.

In the improved SDLT, the post-processing filter 680 is made more aggressive. Noise introduced due to quantization can be approximated to be wideband, and this fact can be used to improve the decoder side reconstruction by making the post processing filter more aggressive, since it is a smoothing operation. Doing so further reduces blocking artifacts and lowers distortion. The use of a more aggressive post-processing filter has the downside of increasing the reconstruction error of the compression system. But, within reasonable bounds, this downside of increasing error especially when the true edge is coincident with the block edge is kept manageable.

Likewise, the pre-processing filter 640 in the improved SDLT is made more relaxed from its nominal (i.e., the inverse of the post-processing filter). Mathematically, this means that the eigenvalues of the relaxed pre-processing filter's matrix are smaller than the eigenvalues of the conventional SDLT pre-processing operation. Consequently, range expansion due to pre processing is reduced.

More specifically, the pre-processing filter 640 and post-processing filter 680 in the improved SDLT are defined as follows. The pre-processing and post-processing filters can be implemented as matrix multiplications with matrices, $P_f$ and $P_i$, respectively, as shown in the following Table 1. In this definition, X is an input overlap block overlaying a border of adjacent transform blocks for the codec, and $\hat{Y}$ is the reconstructed output of the codec for the overlap block. For a conventional SDLT discussed in the Background section above, the matrices $P_f$ and $P_i$ for the pre-processing and post-processing filters are inverses, which is to say the product of the matrices is the identity matrix I. In the improved SDLT, the filters' matrices are mismatched. This means the product of the pre- and post-processing filter's matrices is close-to, but not equal to the identity matrix I. Further, the post-processing filter matrix is made more aggressively smoothing than the nominal post-processing filter in the conventional SDLT (which is an inverse of the pre-processing matrix). The pre-processing filter matrix can then be more relaxed than a nominal inverse of the post-processing matrix, which reduces its range expansion effect. This means the product of the eigenvalues of the pre- and post-processing filter matrices is less than one.

TABLE 1

Definition of Pre-processing and Post-processing Filters in the Improved SDLT

Pre-processing: $Y = P_f X$

Post-processing: $\hat{X} = P_i \hat{Y}$

Conventional lapped transform/inverse transform pair: $P_i \cdot P_f = I$
Mismatched pair (in current invention): $P_i \cdot P_f \approx I$ such that: $\begin{cases} \text{Eig}(P_f) = \sigma_{f0}, \sigma_{f1}, \ldots \geq 1 \\ \text{Eig}(P_i) = \sigma_{i0}, \sigma_{i1}, \ldots \leq 1 \\ \sigma_{fk} \cdot \sigma_{ik} \leq 1 \end{cases}$ The improved SDLT further includes a range reduction operation 642 following the pre-processing filter 640. Since the matching constraint is removed, both pre and post processing operations can be implemented in fixed point arithmetic. Moreover, range expansion can be limited by clipping the pre-processed output to within a permissible range. Although clipping is nonlinear and lossy, its downside can be reduced by properly choosing the prefilter and clipping thresholds.

The improved SDLT also features varying the pre- and post-processing filter mismatch of the SDLT in relation to signal quality achieved by the codec. More specifically, the magnitude of rate-distortion loss due to mismatched pre and post processing filters varies as a function of the compression quality, which can be expressed as a quality metric, such as the quantization parameter QP in the WMP codec. At higher quantization levels (where QP is larger), the distortion as a result of compression is rather large and the mismatch has little to no detriment. In fact, the aggressive post filter has the salubrious effect of better smoothing over noise. However at very low QPs, the codec 600 operates in the near lossless domain. Here, the mismatch may badly affect the rate-distortion performance.

In the codec 600, the SDLT is varied based on quality by simply disabling the SDLT, and revert to the ordinary block transform when the QP is below a threshold. For quantization levels above the threshold where the rate-distortion loss of mismatched SDLT filters is low compared to quantization loss, the SDLT transform is enabled. In an implementation of the codec adhering to the WMP video standard, the SDLT transform is switched off at QP≦7.

Figure 7:
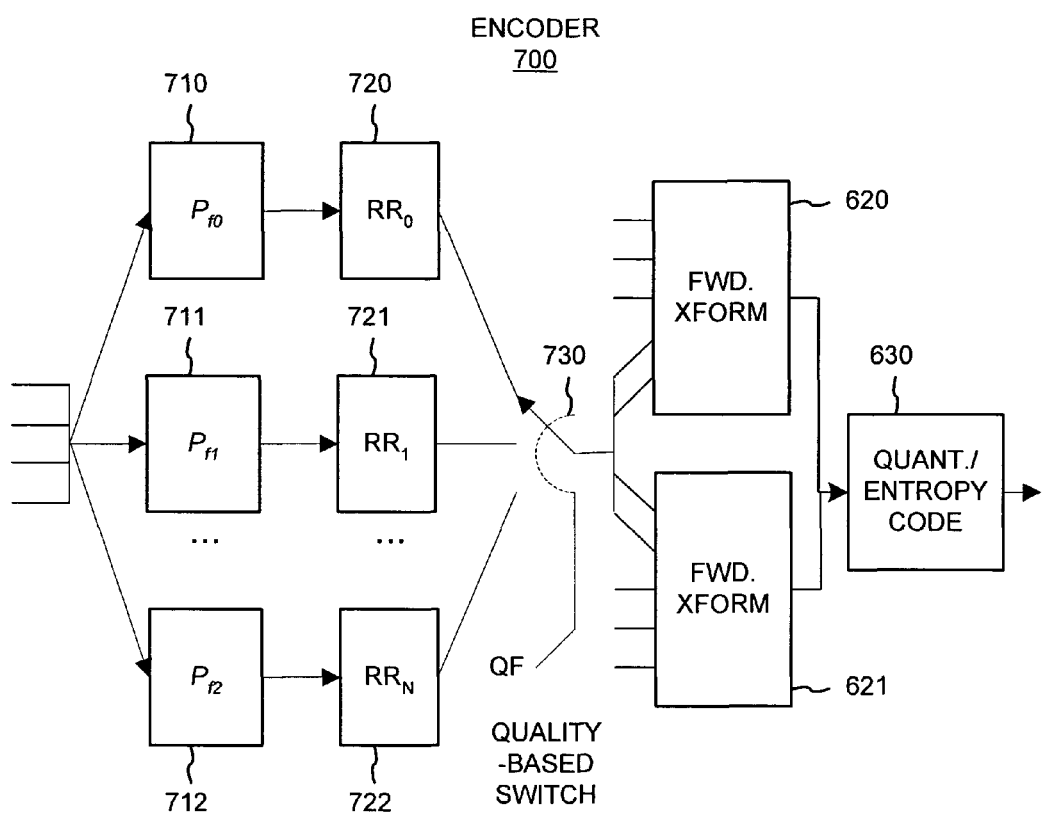
FIG. 7 is a block diagram of a quality-based switching of pre-processing and range reduction for the improved spatial-domain lapped transform in the block transform-based codec of FIG. 6.

FIG. 7 depicts an encoder 700 for an alternative embodiment of the SDLT that further varies the pre- and post-processing filter mismatch relative to compression quality. This alternative embodiment includes a switchable bank of pre and post-processing filters 710-712 with a quality-based switch 730 that chooses a pre-processing filter from the filter bank by a pre-determined or transmitted parameter (i.e., a parameter transmitted between encoder and decoder in the compressed digital media stream) representing a quality metric. A similar switch in the decoder of this embodiment likewise chooses a post-processing filter, such that a pair of pre- and post-processing filters is selected for the given quality level. (The decoder in this embodiment can be a reverse of the illustrated encoder 700, leaving out the range reduction operation 720-722.) In the WMP standard, one such parameter is the quantization parameter (QP) of the video frame. At a very low QP, the pre and post processing steps are disabled (i.e. the corresponding multiplier matrices are identities). At mid levels, the post-processing filter does some moderate amount of smoothing. At high levels of QP, the post-processing filter is a strong smoothing operation. Similarly, the degree of relaxation of the pre-processing filter (and consequent reduction in range expansion of the pre-processing operation) increases with the QP level. In further alternative embodiments, other or separate quality metrics than the quantization parameter can be used to vary the filter mismatch of the SDLT.

2. Illustration of Applying the SDLT to a Video Frame

Figure 1:
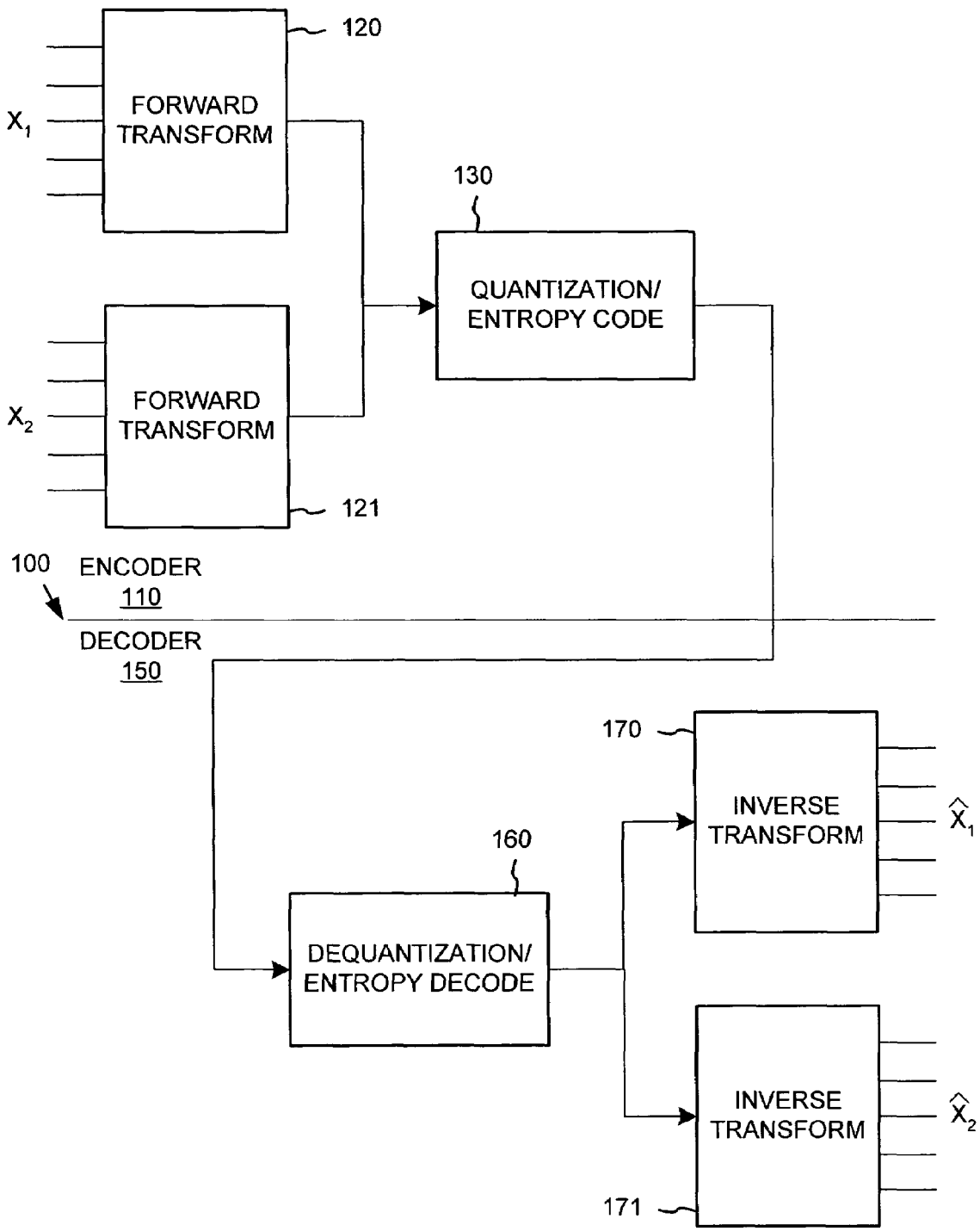
FIG. 1 is a block diagram of a conventional block transform-based codec in the prior art.
Figure 2:
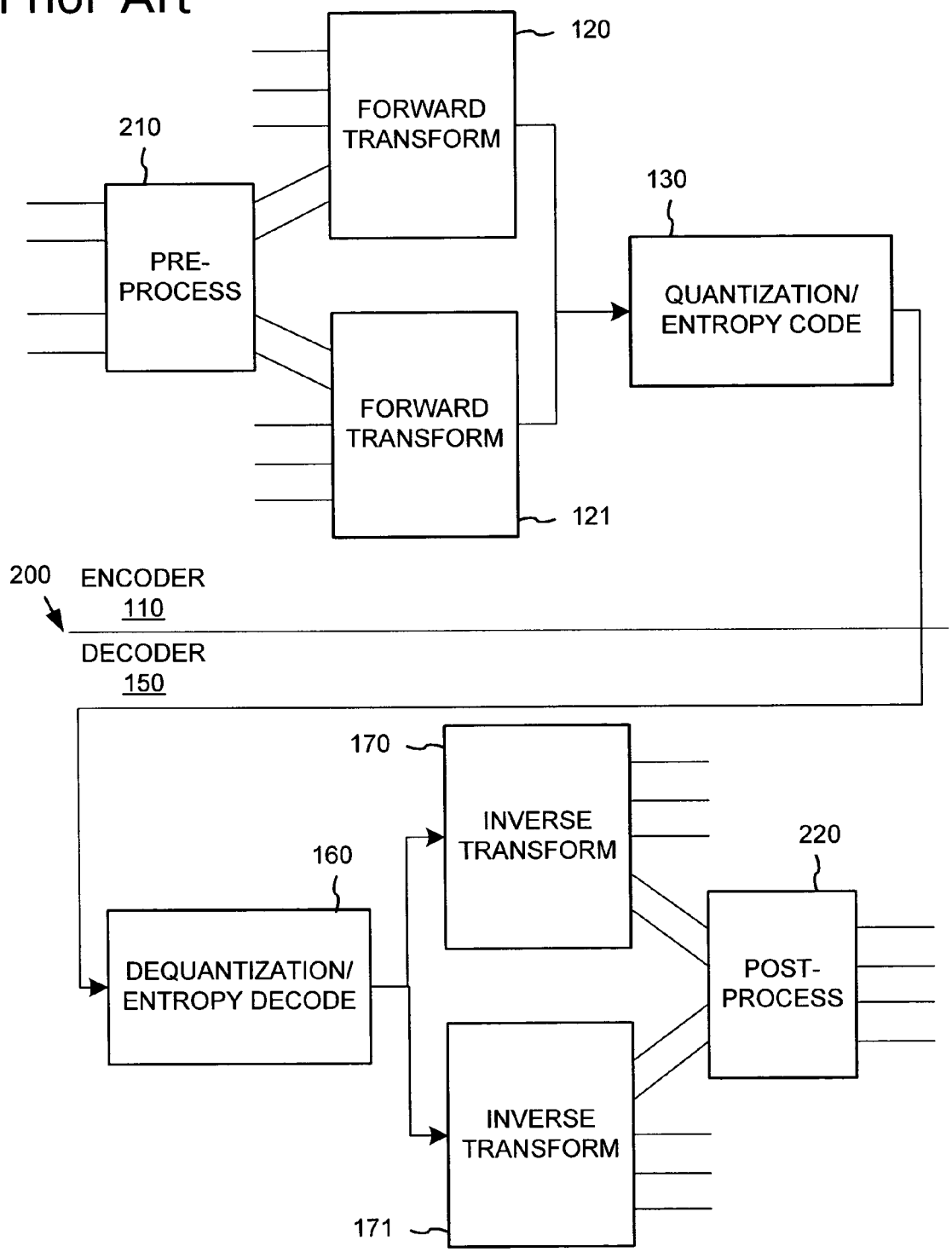
FIG. 2 is a block diagram of a spatial-domain lapped transform implemented as pre and post processing operations in combination with the block transform-based codec of FIG. 1, also in the prior art.
Figure 3:
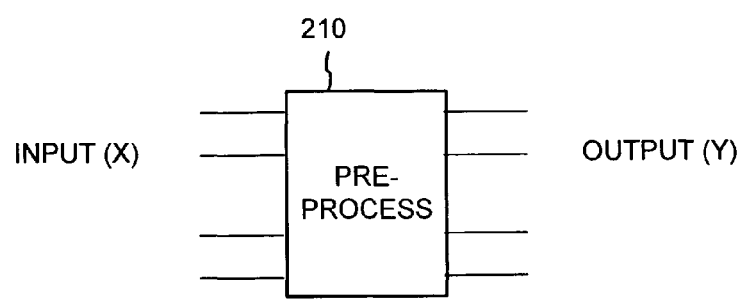
FIG. 3 is a block diagram of a pre-processing operation in the spatial-domain lapped transform of FIG. 2, also in the prior art.
Figure 4:
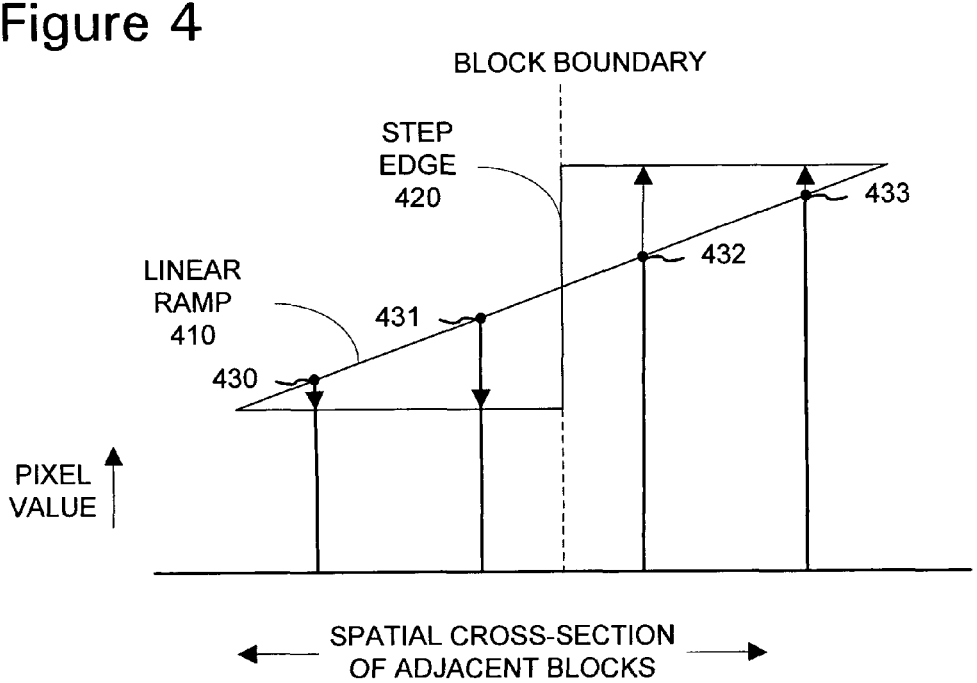
FIG. 4 is a graph illustrating the result of the pre-processing operation in the spatial-domain lapped transform of FIG. 2 on pixels near a block boundary between two example blocks in an image.
Figure 5:
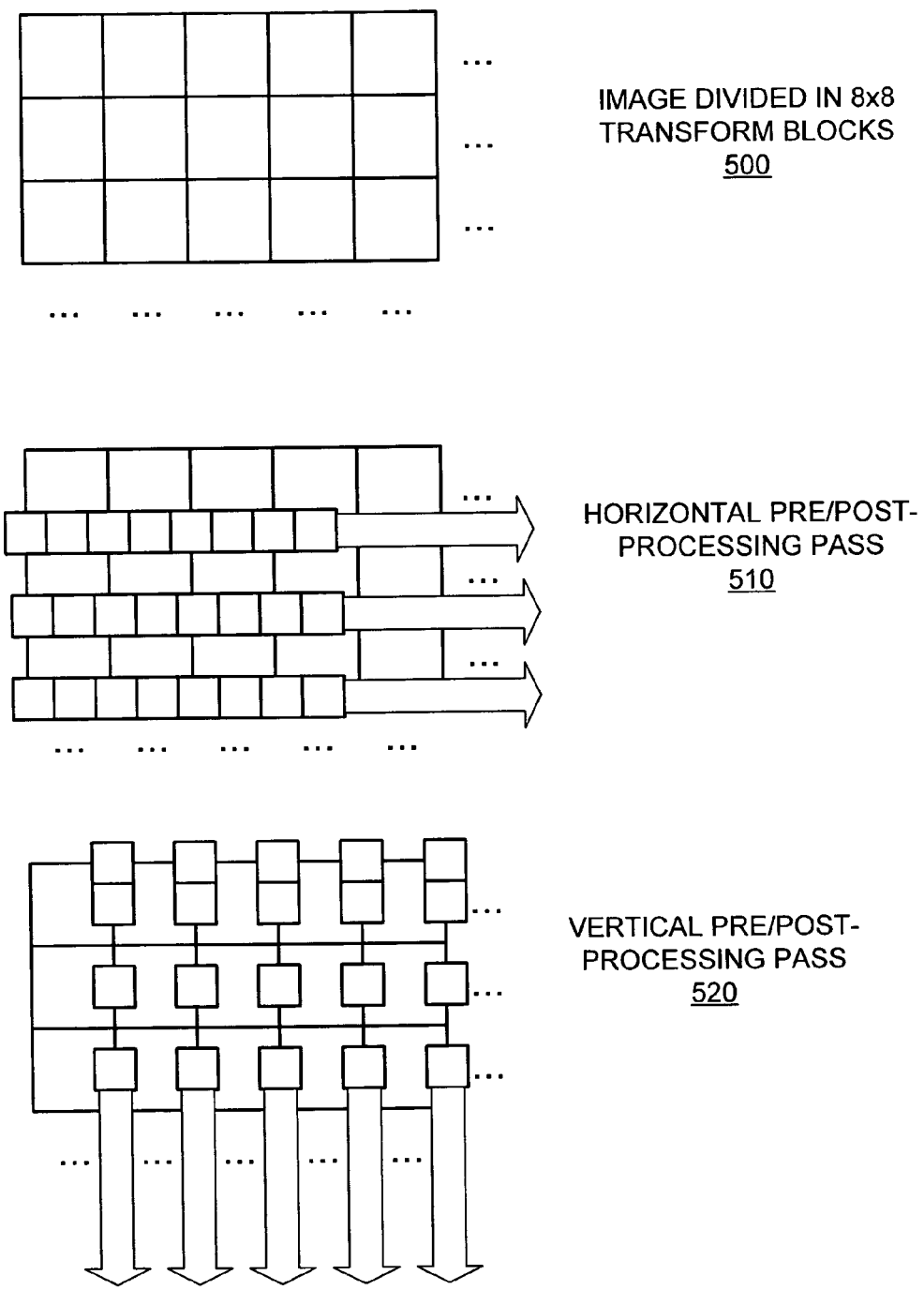
FIG. 5 is a conceptual view of pre- and post-processing passes over an image for an improved spatial-domain lapped transform in FIG. 6.

With reference now to FIG. 5, an implementation of the codec 600 for the WMP compression standard divides an image that is to be coded as an intra-frame or reference frame into 8×8 pixel blocks that are the input of the block transform 620-621. The SDLT in the codec 600 achieves an overlapped transform on blocks with an overlap of 2 pixels by first pre-processing along the borders of the blocks with the pre-processing filter. The pre-processing filter 640 in this case operates on a 4×4 block that extends over the border of adjacent 8×8 transform blocks. In the codec 600, the pre-processing filter is applied at the top-left, top, top-right, left, right, bottom-left, bottom and bottom-right of each 8×8 transform block. This can be accomplished by applying the pre-processing filter to successive 4×4 blocks straddling the block boundaries of adjacent 8×8 transform blocks in successive horizontal and vertical passes over the intra-frame image, as illustrated in FIG. 5. In this way, the coefficients of each 8×8 transform block after pre-processing is then influenced by a 12×12 block from the original intra-frame image (prior to the pre-processing passes) that is concentric with the 8×8 block. The subsequent block transform of the 8×8 transform block is then actually a transform of coefficients derived from a 12×12 block from the original intra-frame image, which overlaps the adjacent 12×12 blocks of succeeding transforms (except for a 4×4 area in the center of each transform block). In effect, this overlap reduces the blocking artifacts that would result from independently coding 8×8 transform blocks.

In the WMP implementation of the codec 600, the SDLT is used to effect an overlapped transform in encoding both intra blocks in inter-frames, as well as all blocks in intra-frames. The intra-frames are reference frames, which are encoded without reference to other frames in the video's temporal sequence. On the other hand, the inter-frames are encoded with relative to a preceding and/or subsequent intra-frame.

A suitable pre-processing filter preferably is implemented as a matrix of integer values, with a possible scaling by a multiple of two. This allows the pre-processing filter to be more efficiently executed on a processing unit of a computer, or on a graphics or audio processor. An example of a suitable pre-processing filter matrix for the WMP implementation of the codec 600 is the following matrix, $P_f$.

$$P_f = \begin{bmatrix} 37 & 0 & 0 & -5 \\ 7 & 37 & -5 & -7 \\ -7 & -5 & 37 & 7 \\ -5 & 0 & 0 & 37 \end{bmatrix} \bigg/ 32$$

For input pixel values with a range R, the worst case output range resulting from this pre-processing filter matrix 640 is equal to 1.75R. For two dimensional data (e.g., image or video), the range expansion factor for this pre-processing filter matrix is $1.75^2 = 3.0625$. In the case of the WMP video standard, the input raw pixel data is expected to be integer values in the range [0, 255]. For compression, the pixel input data is re-centered to the range [−128, 127], after which the pre-processing filter 640 is applied.

In the range reduction (clipping) operation 642 (FIG. 6), the data points below −256 are clipped to −256, and those above 255 are clipped to 255. In practice, such situations (where the pre-processing filter produces values outside the range) are not common. The range [−256, 255] is represented in 9 bits, which is the expected input values to the forward block transform 620-621 in the WMP standard.

The post-processing filter 680 also is preferably implemented as a matrix of integer values, with a possible scaling by a multiple of 2. An example of such a filter suitable for use in a codec complying to the WMP video standard is the following matrix, $P_i$.

$$P_i = \begin{bmatrix} 7 & 0 & 0 & 1 \\ -1 & 7 & 1 & 1 \\ 1 & 1 & 7 & -1 \\ 1 & 0 & 0 & 7 \end{bmatrix} \bigg/ 8$$

The post-processing filter 680 is applied to 4×4 block bridging the boundaries of adjacent 8×8 transform blocks similar to the pre-processing filter passes as illustrated in FIG. 5. Following the post-processing, the pixels are restored to their original value range by adding an offset of 128.

3. Computing Environment

The above described codec with improved SDLT can be performed on any of a variety of devices in which digital media signal processing is performed, including among other examples, computers; image and video recording, transmission and receiving equipment; portable video players; video conferencing; and etc. The digital media coding techniques can be implemented in hardware circuitry, as well as in digital media processing software executing within a computer or other computing environment, such as shown in FIG. 8.

Figure 8:
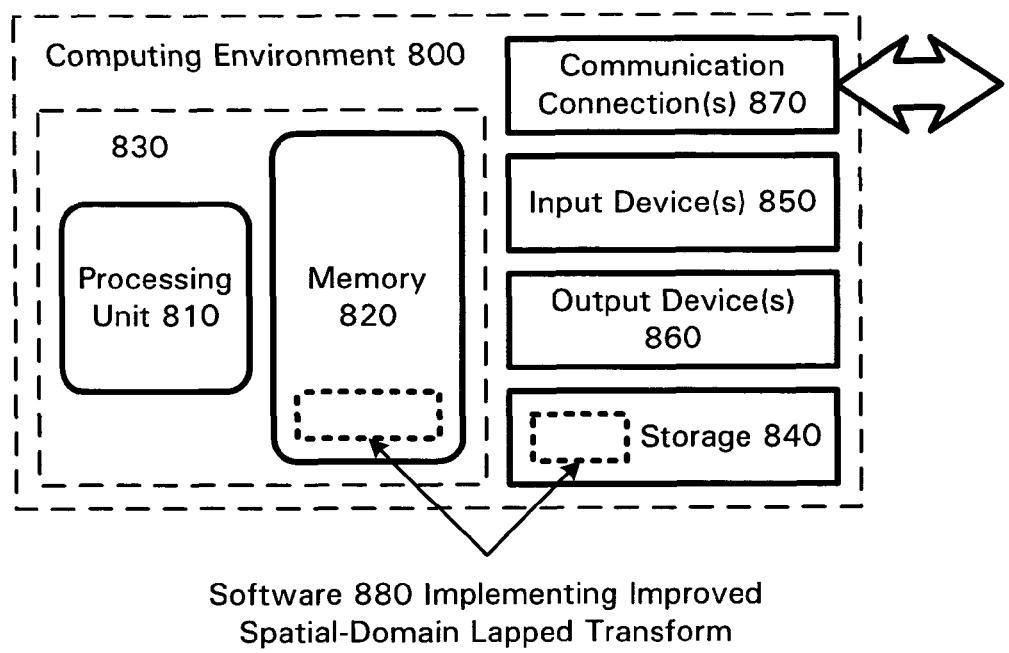
FIG. 8 is a block diagram of a suitable computing environment for implementing the block transform-based codec with improved spatial-domain lapped transform of FIG. 6.

FIG. 8 illustrates a generalized example of a suitable computing environment (800) in which described embodiments may be implemented. The computing environment (800) is not intended to suggest any limitation as to scope of use or functionality of the invention, as the present invention may be implemented in diverse general-purpose or special-purpose computing environments.

With reference to FIG. 8, the computing environment (800) includes at least one processing unit (810) and memory (820). In FIG. 8, this most basic configuration (830) is included within a dashed line. The processing unit (810) executes computer-executable instructions and may be a real or a virtual processor. In a multi-processing system, multiple processing units execute computer-executable instructions to increase processing power. The memory (820) may be volatile memory (e.g., registers, cache, RAM), non-volatile memory (e.g., ROM, EEPROM, flash memory, etc.), or some combination of the two. The memory (820) stores software (880) implementing the described encoder/decoder and transforms.

A computing environment may have additional features. For example, the computing environment (800) includes storage (840), one or more input devices (850), one or more output devices (860), and one or more communication connections (870). An interconnection mechanism (not shown) such as a bus, controller, or network interconnects the components of the computing environment (800). Typically, operating system software (not shown) provides an operating environment for other software executing in the computing environment (800), and coordinates activities of the components of the computing environment (800).

The storage (840) may be removable or non-removable, and includes magnetic disks, magnetic tapes or cassettes, CD-ROMs, CD-RWs, DVDs, or any other medium which can be used to store information and which can be accessed within the computing environment (800). The storage (840) stores instructions for the software (880) implementing the codec with improved SDLT.

The input device(s) (850) may be a touch input device such as a keyboard, mouse, pen, or trackball, a voice input device, a scanning device, or another device that provides input to the computing environment (800). For audio, the input device(s) (850) may be a sound card or similar device that accepts audio input in analog or digital form, or a CD-ROM reader that provides audio samples to the computing environment. The output device(s) (860) may be a display, printer, speaker, CD-writer, or another device that provides output from the computing environment (800).

The communication connection(s) (870) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The digital media processing techniques herein can be described in the general context of computer-readable media. Computer-readable media are any available media that can be accessed within a computing environment. By way of example, and not limitation, with the computing environment (800), computer-readable media include memory (820), storage (840), communication media, and combinations of any of the above.

The digital media processing techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

I claim:

1. A digital media signal processing system comprising:
a block transform-based codec for compressively encoding transform-coding blocks of a digital media signal to form a compressed representation of the digital media signal at encoding, and to decode blocks from the compressed representation to reconstruct the digital media signal at decoding;
a pre-processing filter for applying to overlapping blocks that overlap adjacent of the transform-coding block of the digital media signal prior to encoding by the block transform-based codec to effect spatial-domain lapped transform of the digital media signal; and
a post-processing filter for applying to overlapping blocks that overlap adjacent of the decoded blocks after decoding by the block transform-based codec, wherein the post-processing filter is not an inverse of the pre-processing filter, wherein the pre-processing filter is more relaxed and the post-processing filter is more aggressive relative to filters that are respectively inverses of the other.

2. The digital media signal processing system of claim 1 wherein the pre-processing filter has eigenvalues that are less than that of a filter that is an inverse of the post-processing filter.

3. The digital media signal processing system of claim 1 wherein the post-processing filter has eigenvalues that are greater than that of a filter that is an inverse of the pre-processing filter.

4. The digital media signal processing system of claim 1 wherein the pre-processing filter has eigenvalues and the post-processing filter has eigenvalues, such that a product of the filters' eigenvalues is less than one.

5. A digital media signal processing system comprising:
a block transform-based codec for compressively encoding transform-coding blocks of a digital media signal to form a compressed representation of the digital media signal at encoding, and to decode blocks from the compressed representation to reconstruct the digital media signal at decoding, the block transform-based codec having a quantization parameter relating to an amount of quantization applied at encoding;

a set of pairs of pre-processing and post-processing filters, the pre-processing filter for applying to overlapping blocks that overlap adjacent of the transform-coding block of the digital media signal prior to encoding by the block transform-based codec to effect spatial-domain lapped transform of the digital media signal, the post-processing filter for applying to overlapping blocks that overlap adjacent of the decoded blocks after decoding by the block transform-based codec; and a switch for selecting a pair of pre-processing and post-processing filters from the set for use with the block transform-based codec according to the quantization parameter.

6. The digital media signal processing system of claim 5 wherein the block transform-based codec explicitly encodes a value of the quantization parameter into the compressed representation at encoding.

7. The digital media signal processing system of claim 5 wherein the switch operates to enable processing of the spatial-domain lapped transform by a pre-processing and post-processing filter pair when the quantization parameter is indicative of low quality, and disable processing by the filter pair when the quantization parameter is indicative of high quality.

8. The digital media signal processing system of claim 5 wherein the switch operates to select among a bank of plural filter pairs having progressively more relaxed pre-processing filter and progressively more aggressive post-processing filter as the quantization parameter is indicative of decreasing quality.

9. A digital signal encoder device for encoding a digital media signal according to a digital media block-transform-based codec applying a post-processing filter at decoding to overlapping blocks that overlap adjacent decoded transform-coded blocks, comprising:

a forward block transform for applying on a block basis to the digital media signal to transform the blocks into a transform-domain representation for encoding in a compressed representation of the digital media signal; and a pre-processing filter for applying to overlapping blocks that overlap adjacent of the transform blocks of the digital media signal prior to the forward block transform to effect spatial-domain lapped transform of the digital media signal, wherein the pre-processing filter is not an inverse of the post-processing filter, and wherein the pre-processing filter is more relaxed and the post-processing filter is more aggressive relative to filters that are respectively inverses of the other.

10. The digital signal encoder device of claim 9 wherein the pre-processing filter has eigenvalues that are less than that of a filter that is an inverse of the post-processing filter.

11. The digital signal encoder device of claim 9 wherein the pre-processing filter has eigenvalues and the post-processing filter has eigenvalues, such that a product of the filters' eigenvalues is less than one.

12. The digital signal encoder device of claim 9 further comprising:

a range reduction operation following the pre-processing filter for reducing a range of coefficient values in the overlapping blocks filtered by the pre-processing filter.

13. The digital signal encoder device of claim 12 wherein the range reduction operation is a clipping of the coefficients values to remain within a limited range.

14. The digital signal encoder device of claim 12 wherein the range reduction operation clips values of the coefficient to an input value range of the forward block transform.

15. The digital signal encoder device of claim 9 wherein the block transform-based codec has a compression quality parameter, the device comprising:

a set of pre-processing filters; and a switch for selecting the pre-processing filter from the set according to the compression quality parameter for use in encoding the digital media signal.

16. The digital signal encoder device of claim 15 wherein the compression quality parameter is a quantization parameter.

17. The digital signal encoder device of claim 15 wherein the block transform-based codec explicitly encodes a value of the compression quality parameter into the compressed representation at encoding.

18. The digital signal encoder device of claim 15 wherein the switch operates to enable processing of the spatial-domain lapped transform by a pre-processing filter when the compression quality parameter is indicative of low quality, and disable processing by the pre-processing filter when the compression quality parameter is indicative of high quality.

19. The digital signal encoder device of claim 15 wherein the switch operates to select among a bank of plural progressively more relaxed pre-processing filters as the compression quality parameter is indicative of decreasing quality.

20. A method of compressively encoding and decoding a digital media signal, comprising:

at encoding:

applying a forward block transform to a group of adjoining transform-coding blocks of the digital media signal to produce transform-domain representations of the blocks; and applying a pre-processing filter to overlapping blocks that overlap adjacent of the transform-coding blocks of the digital media signal prior to the forward block transform to effect spatial-domain lapped transform of the digital media signal; and at decoding:

applying an inverse block transform to the transform-domain representation of the transform-coding blocks; and applying a post-processing filter following the inverse block transform to the overlapping blocks;

wherein the pre-processing filter is not an inverse of the post-processing filter, and wherein the pre-processing filter is more relaxed and the post-processing filter is more aggressive relative to filters that are respectively inverses of the other.

21. The method of claim 20 wherein the pre-processing filter has eigenvalues that are less than that of a filter that is an inverse of the post-processing filter.

22. The method of claim 20 wherein the pre-processing filter has eigenvalues and the post-processing filter has eigenvalues, such that a product of the filters' eigenvalues is less than one.

23. The method of claim 20 further comprising:

performing a range reduction operation following the pre-processing filter for reducing a range of coefficient values in the overlapping blocks filtered by the pre-processing filter.

24. The method of claim 23 wherein the range reduction operation is a clipping of the coefficients values to remain within a limited range.

25. The method of claim 23 wherein the range reduction operation clips values of the coefficient to an input value range of the forward block transform 26. The method of claim 20 comprising:
selecting a pair of the pre-processing filter and the post-processing filter from a set of pre-processing and post-processing filter pairs according to a compression quality parameter for use in encoding the digital media signal.

27. The method of claim 26 wherein the compression quality parameter is a quantization parameter.

28. The method of claim 26 further comprising explicitly encoding a value of the compression quality parameter into the compressed representation at encoding.

29. The method of claim 26 wherein the selecting comprises:
enabling processing of the spatial-domain lapped transform by a pre-processing filter and post-processing filter pair when the compression quality parameter is indicative of low quality; and
disabling processing by the pre-processing filter and the post-processing filter when the compression quality parameter is indicative of high quality.

30. The method of claim 26 wherein the selecting comprises selecting among a bank of plural filter pairs having progressively more relaxed pre-processing filter and progressively more aggressive post-processing filter as the compression quality parameter is indicative of decreasing quality.

31. A digital media signal decoder for decoding a digital media signaled encoded by a block transform-based codec that operates to compressively encode transform-coding blocks of a digital media signal to form a compressed digital media signal based on a quantization parameter signaled in the compressed digital media signal, the block transform-based codec applying a pre-processing filter applied on blocks overlapping adjacent of the transform-coding blocks to effect a spatial-domain lapped transform, the digital media signal decoder comprising:
a block transform-based decoder for decoding the transform-coded blocks;
a set of post-processing filters for applying to overlapping blocks that overlap adjacent of the decoded blocks after decoding by the block transform-based decoder; and
a switch for selecting among the post-processing filters from the set for use with the block transform-based codec according to the quantization parameter.

32. The digital media signal processing system of claim 31 wherein the switch operates to enable processing of the spatial-domain lapped transform by a post-processing filter when the quantization parameter is indicative of low quality, and disable processing by the post-processing filter when the quantization parameter is indicative of high quality.

33. The digital media signal processing system of claim 31 wherein the switch operates to select among a bank of plural post-processing filters having progressively more relaxed pre-processing filter as the quantization parameter is indicative of decreasing quality.

34. The digital media signal processing system of claim 31 wherein the set of post-processing filters includes a filter implementing the following matrix:

$$P_i = \begin{bmatrix} 7 & 0 & 0 & 1 \\ -1 & 7 & 1 & 1 \\ 1 & 1 & 7 & -1 \\ 1 & 0 & 0 & 7 \end{bmatrix} \Big/ 8$$

35. The digital media signal processing system of claim 1 wherein the post-processing filter is a filter implementing the following matrix:

$$P_i = \begin{bmatrix} 7 & 0 & 0 & 1 \\ -1 & 7 & 1 & 1 \\ 1 & 1 & 7 & -1 \\ 1 & 0 & 0 & 7 \end{bmatrix} \Big/ 8.$$

* * * * *